May 20, 1947.　　　J. L. WENZEL　　　2,420,804
TIRE CHAIN
Filed March 29, 1945

INVENTOR.
Joseph L. Wenzel
BY
ATTORNEY.

Patented May 20, 1947

2,420,804

UNITED STATES PATENT OFFICE 2,420,804

TIRE CHAIN

Joseph L. Wenzel, Kansas City, Mo.

Application March 29, 1945, Serial No. 585,452

3 Claims. (Cl. 152—213)

This invention relates to automotive appliances in the nature of removable chains for wheels, and has for its primary aim to provide a tire chain having as a part thereof, means for conveniently mounting the chain in place without employing a jack and without the usual inconvenience due to the utilization of flexible strips, which are customarily a part of chain assemblies as they are now marketed.

One of the important objects of this invention is to provide a tire chain assembly, capable of quick attachment to automobile wheels where the wall of the wheel is provided with slots through which a section of the assembly must be projected before the chain can be latched in the operative position.

A further aim of the instant invention is the provision of a tire chain assembly for automobile wheels, which assembly includes a flexible section adapted to cross the tread of the tire, and a stiff or rigid section, longitudinally arched for quick threading through conventional slots prior to securing the free ends of the chain assembly together.

Other aims of the invention will become apparent during the course of the following specification, referring to the accompanying drawing wherein.

Figure 1:
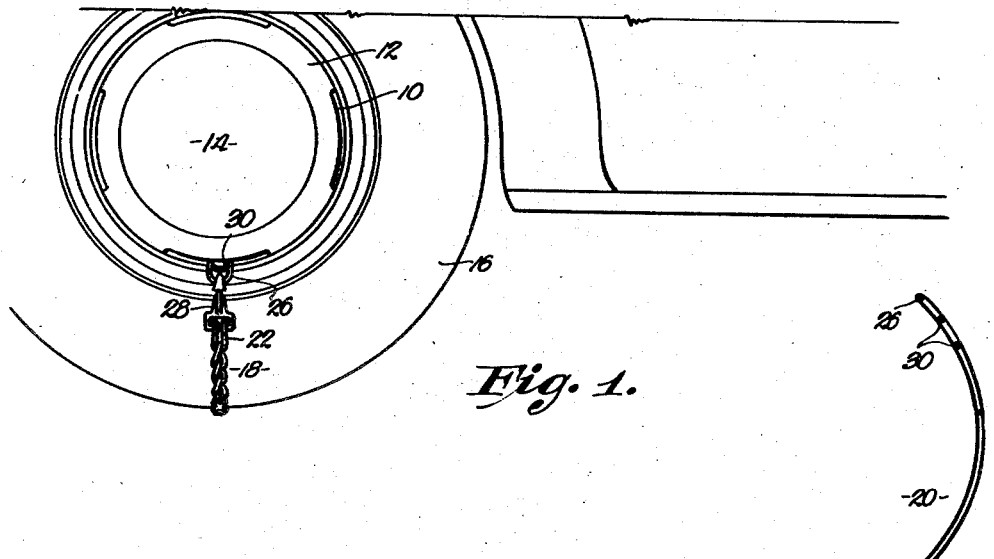
Fig. 1 is a side elevational view of an automobile tire having a chain assembly thereon and made in accordance with the present invention.

The particular type of tire chains to which this invention relates, are those of the unitary character where a number of individual cross chains are mounted around the rim and tire of the wheel without the employment of interconnecting, annular chains or side cables. These individual chains are mounted by threading a portion thereof through slots 10, formed in the wall 12 of a conventional wheel, which in the drawing has been generally designated by the numeral 14.

A tire 16 mounted on wheel 14 has a tread portion disposed as is well understood, and across this tread portion and upwardly along the side walls adjacent thereto, the flexible section 18 of the chain assembly is stretched. To hold this flexible section 18 in place, there is provided an interconnecting section 20 which must be threaded through the adjacent slot 10. Heretofore, this said section has been in the form of a flexible webbing, tape or strip without rigidity, and incapable of selfsupport sofar as forcing the same through slots 10 is concerned.

Section 20 in the chain assembly, constructed pursuant to this invention, comprises a longitudinally arched rebent, attenuated member formed of wire or the like and pivotally secured to the terminal link 22 of flexible section 18. The usual cross links comprise this section 18 and when section 20 is associated with one end of section 18, the inturned ends 24 of section 20 may be welded together or otherwise treated to insure against accidental displacement.

The bight 26 of section 20 is normally engaged by the snap hook 28 that is mounted at the opposite end of section 18 from that end to which section 20 is attached. Snap hook 28 is brought into engagement with bight 26 when the chain is in the operative position, clearly illustrated in Fig. 1.

To insure that the chain assembly may be affixed to tires of various sizes within a selected range, section 20 is provided with a number of transverse elements 30, spaced at intervals inwardly from bight 26. These arcuate members 30 will receive hook 28 and operably hold flexible section 18 across the tread of tire 16.

When the tire chain assembly is to be mounted, it is but necessary to grasp the end of section 20 which is attached to link 22, and reach behind tire 16 a sufficient distance to project the free end of section 20 (being the bight 26 thereof), through the closest slot 10. No. folding, buckling or collapsing will occur, such as is the case when a flexible strip is used as the rim engaging part of the assemblies now available. As soon as the bight of section 20 is extended through slot 10, it is grasped and pulled to a point where hook 28 may engage the same.

Figure 2:
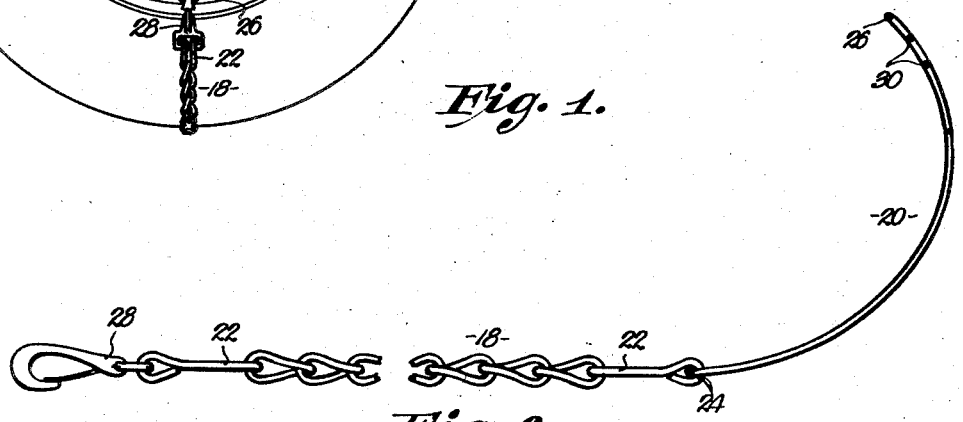
Fig. 2 is an enlarged stretch-out edge elevational view of a tire chain assembly illustrating the preferred embodiment of the invention and showing the same entirely removed from operative position.
Figure 3:
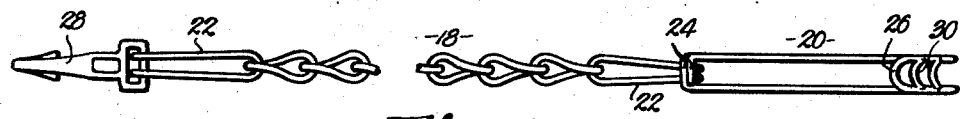
Fig. 3 is an inside elevational view of the assembly.
Figure 4:
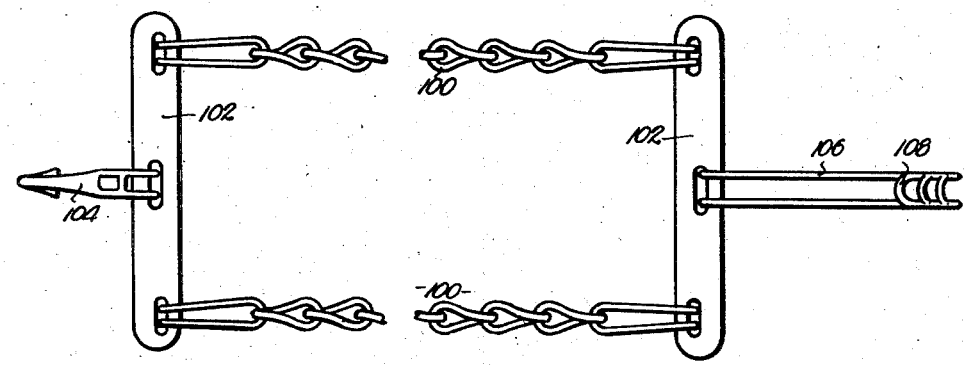
Fig. 4 is an inside elevational view of a tire chain assembly having a plurality of tread-engaging sections made in accordance with a modified form of the invention.

In the form of the invention illustrated in Fig. 4, flexible sections 100 are identical to section 18, as illustrated in Figs. 2 and 3. There are two of these flexible sections however, and they are joined by cross heads 102, one of which receives snap hook 104 while the other is coupled to rigid or stiff arcuate section 106.

Section 106 has the bight 108 as above described, and this chain with a plurality of cross sections 100 may be mounted as easily as the single chain with a unitary flexible section 18.

The longitudinally arched stiff sections 20 and 106 respectively, are substantially semi-circular and overlie the rim of the wheel. The employment of such sections eliminates the necessity of having to lie on the ground for the purpose of reaching close to slots 10 for forcing a flexible strip therethrough. Ease of attachment, therefore, is the outstanding advantage and the desirability of the chain structure illustrated and described, is at once obvious to those who have experienced difficulty in trying to thread frayed webbing through such slots as those indicated by the numeral 10.

Sections 20 may be associated with the series of cross links or flexible section 18 by the user after purchasing the parts separately. For example, cross links 18 may be bought on the open market as replacements for the chains, and if section 20 is made available as an article of manufacture, the automobile owner may assemble his complete chain. Inturned ends would not be welded in such instances, but would be held in place by the inherent resiliency of the material from which the section is formed.

In the event sections 20 are separately sold, the length of the same may be altered to meet tire size requirements. Links 22 of section 18 would receive section 20 and hook 29 respectively, and the easily applied anti-skid or mud chain would be produced by the customer of the store handling the three component parts, i. e..the section 20, section 18 and hook 28.

Obviously, tire chains having physical characteristics different from those shown and set down above, may be made without departing from the spirit of the invention or scope of the appended claims.

Having thus described the invention, what is claimed as new and desired to be secured by Letters Patent is:

1. A tire chain assembly of the character described comprising a pair of crossheads; a flexible section including a plurality of spaced apart chain lengths joined to said crossheads and adapted to lie transversely across the tread of the tire and inwardly against the side walls of said tire; a stiff arcuate section mounted on one of the crossheads and adapted to embrace the rim of the tire supporting wheel; and cooperating coupling elements on the other crosshead and at one end of the stiff arcuate section, said stiff arcuate section comprising a substantially U-shaped body having the coupling elements at the bight thereof.

2. A tire chain assembly of the character described comprising a flexible section including at least one length of chain adapted to lie transversely across the tread of the tire and inwardly against the side walls of said tire; a stiff arcuate section adapted to interconnect the ends of the flexible section and embrace the rim of the tire supporting wheel; and cooperating coupling elements at one end of the flexible section and at one end of the stiff arcuate section, said stiff arcuate section comprising a substantially U-shaped body having the coupling elements at the bight thereof, said cooperating coupling elements comprising a snap-hook on the flexible section and a series of hook-engaging elements on the stiff arcuate section, said hook-engaging elements comprising a plurality of arcuate cross bars fixed to the legs of said U-shaped body.

3. As a new article of manufacture, a pair of crossheads; a plurality of chain lengths interconnecting said crossheads; an attenuated, longitudinally arched link attached to one of said crossheads, said link comprising a stiff, substantially U-shaped body; and cooperating coupling elements on the other of said crossheads and near the free end of said arched link, said cooperating coupling elements comprising a snap-hook on the said other crosshead and a series of hook-engaging elements on the arched link, said hook-engaging elements comprising a plurality of arcuate cross bars fixed to the legs of said link.

JOSEPH L. WENZEL.

REFERENCES CITED

The following references are of record in the file of this patent:

UNITED STATES PATENTS

| Number | Name | Date |
|---|---|---|
| 1,103,396 | Coan | July 14, 1914 |
| 999,384 | Martin | Aug. 1, 1911 |
| 1,427,003 | Lucas | Aug. 22, 1922 |
| 2,198,883 | Pattison | Apr. 30, 1940 |

FOREIGN PATENTS

| Number | Country | Date |
|---|---|---|
| 791,063 | France | 1935 |